United States Patent [19]
Andersen

[11] Patent Number: 4,948,484
[45] Date of Patent: Aug. 14, 1990

[54] PROCESS FOR PRODUCING IMPROVED ELECTROLYTIC MANGANESE DIOXIDE

[75] Inventor: Terrell N. Andersen, Edmond, Okla.

[73] Assignee: Kerr-McGee Chemical Corporation, Oklahoma City, Okla.

[21] Appl. No.: 210,361

[22] Filed: Jun. 23, 1988

[51] Int. Cl.$^5$ .............................................. C25C 1/00
[52] U.S. Cl. .............................. 204/105 M; 204/130; 429/224
[58] Field of Search ................... 429/224; 204/105 M, 204/96, 130

[56] References Cited

U.S. PATENT DOCUMENTS

| 3,893,870 | 7/1975 | Kozawa | 429/224 |
| 4,091,178 | 5/1978 | Kordesch | 429/224 |
| 4,306,005 | 12/1981 | Ruben | 429/224 |
| 4,384,029 | 5/1983 | Kordesch | 429/224 |
| 4,451,543 | 5/1984 | Dziectuch et al. | 429/224 |
| 4,758,484 | 7/1988 | Furukawa et al. | 429/224 |

FOREIGN PATENT DOCUMENTS 57-42542 3/1982 Japan.
60-9631 5/1985 Japan.

OTHER PUBLICATIONS

The 3rd Battery Material Symposium, Honolulu, 1987, Extended Abs. No. 1.6, pp. 21–22 (J. Koshiba and Y. Karogi).
Chemical Engineers' Handbook, J. Perry, 4ed., pp. 21–37 et seq (1963).

Primary Examiner—John F. Niebling
Assistant Examiner—Steven P. Marquis
Attorney, Agent, or Firm—William G. Addison; John P. Ward; Herbert M. Hanegan

[57] ABSTRACT

There is provided a process for improving the alkaline discharge capacity of electrolytic manganese dioxide. The process comprises forming a mixture of electrolytic manganese dioxide, a carbon material and a strong base electrolyte and subjecting the mixture to electrochemical oxidation, in the presence of additional strong base electrolyte, while maintaining the mixture in an anodic condition. The process further comprises leaching the oxidized mixture to effect removal of any water soluble manganese salt byproducts formed during the electrochemical oxidation process.

19 Claims, No Drawings

PROCESS FOR PRODUCING IMPROVED ELECTROLYTIC MANGANESE DIOXIDE

FIELD OF THE INVENTION

The present invention relates to a process for preparing an improved electrolytic manganese dioxide. More particularly, the present invention relates to a process for improving the alkaline discharge capacity of electrolytic manganese dioxide and to the electrolytic manganese dioxide so improved.

BACKGROUND OF THE INVENTION

It is known that, in the manufacture of present day alkaline batteries of the manganese dioxide/zinc type, electrolytic manganese dioxide is the preferred material for use as the cathodic (or depolarizing) reactant. This preference primarily is due to the ability of electrolytic manganese dioxide to provide batteries having significantly improved discharge capacities compared to batteries produced from naturally occurring or chemically produced manganese dioxides.

It also is known that the degree to which electrolytic manganese dioxide can improve the discharge capacities of such batteries depends, to a large extent, on various operating conditions employed in the electrolysis process used in the manufacture of this material. Among the more important operating conditions (or deposition parameters) effecting the degree to which electrolytic manganese dioxide can improve the discharge capacities of such batteries are the purity of the electrolyte, the composition of the electrolyte, temperatures, current densities, the type of material used for anodes and the like employed in the manufacture of the electrolytic manganese dioxide.

In addition to the improvements attainable through optimization of the above noted operating conditions, further improvements in battery discharge capacities reportedly have been accomplished by subjecting electrolytic manganese dioxide to various post production treatments. One such post-treatment is described in Japanese Kokai No. 60-96531 (May 30, 1985). The post-treatment described in this application comprises heating electrolytic manganese dioxide at a temperature between 100° C. and 230° C. Such heating is disclosed as being effective to remove both surface as well as chemically bound water from this material. This removal is reported to result in an electrolytic manganese dioxide having discharge characteristics of longer duration. A further literature article on the thermal post-treatment of electrolytic manganese dioxide and its effect on the discharge capacities thereof is that of J. Koshiba and Yo Karogi in *The 3rd Battery Material Svmoosium, Honolulu*, 1987, Extended Abstract No. 1.6, IBA Publishers, 1987, pp 21-22.

Another post-treatment that has been proposed for electrolytic manganese dioxide is the method described in Japanese Kokai No. 57-42542 (March 10, 1982). The method described in this application comprises leaching electrolytic manganese dioxide in an alkaline potassium manganate solution at elevated temperatures, e.g. 120 C. The advantage stated to be gained by this post-treatment procedure is an alkaline battery exhibiting a higher open circuit voltage and minimal fluctuation. Good shelf life is another advantage, which it is proposed, would be expected.

It is apparent from the above that, to remain competitive, electrolytic manganese dioxide manufacturers must be able to produce the highest quality product and in a most economical manner. Thus, new processes of manufacture or post-treatments capable of providing such high quality in an economical manner would, by definition, constitute a significant contribution to this field. The present invention provides such a contribution.

SUMMARY OF THE INVENTION

The present invention relates to a process for treating electrolytic manganese dioxide for use in alkaline batteries. Particularly the present invention is directed to a process in which a mixture of an electrolytic manganese dioxide, carbon and a strong base electrolyte solution first is formed. This mixture then is subjected to electrochemical oxidation in the presence of further strong base electrolyte solution while maintaining the mixture under anodic conditions.

In a further embodiment of the present invention, the resulting oxidized mixture is subjected to an aqueous leach treatment. The purpose of this leach treatment is to effect removal of any water soluble manganese salt byproducts formed during the electrochemical oxidation of the above described mixture.

The present invention further relates to an improved electrolytic manganese dioxide prepared in accordance with the above described process and which improved electrolytic manganese dioxide possesses an enhanced alkaline discharge capacity.

DETAILED DESCRIPTION OF THE INVENTION

It now has been discovered that, when treated in accordance with the process of the present invention, electrolytic manganese dioxide can be enhanced with respect to its alkaline discharge capacity. This enhancement, in turn, leads to alkaline batteries which will exhibit extended service lives compared to similar batteries produced from non-treated electrolytic manganese dioxide.

Broadly, the present invention comprises a process whereby a mixture containing electrolytic manganese dioxide, a carbon material and a strong base electrolyte is subjected to electrochemical oxidation. Optionally, this oxidized mixture then can be subjected to an aqueous leach treatment whereby any water soluble salt byproducts formed in the mixture during the oxidation step are removed.

As disclosed hereinabove, the first step in the present process comprises the formation of a mixture of an electrolytic manganese dioxide, a carbon material and a strong base electrolyte. The manner in which the mixture is prepared is not critical and any of the known and conventional mixing apparatus employed to prepare physical mixtures of solids can be employed. Representative examples of known mixing apparatus suitable for preparing the mixtures employed in the present invention include double cone and twin shell (V-type) mixers, ribbon mixers, screw-type mixers, turbine mixers and the like. A more comprehensive list of suitable mixing equipment for use in the practice of the present invention can be found in *Perry's Chemical Engineering Handbook*, 4Ed., pp 21-37 et seq (1963).

Generally, both the electrolytic manganese dioxide and the carbon material are introduced into and blended in the mixing apparatus in the form of dry, particulate solid materials. Typically, the strong base electrolyte will be blended into the mixture in the form of an aqueous solution. The amounts of each of the materials introduced into and blended together in the mixing apparatus will be amounts sufficient to provide mixtures containing weight ratios of the electrolytic manganese dioxide to the carbon material ranging up to about 12:1 and higher. However, significantly smaller weight ratios can be employed to produce an improved electrolytic manganese dioxide in accordance with the process of the present invention. In this respect, it has been found that improved electrolytic manganese dioxide can be produced from mixtures containing the electrolytic manganese dioxide and a carbon material in weight ratios of the electrolytic manganese dioxide to the carbon material of as low as about 0.33:1 and lower. Thus, in its broadest aspects, the weight ratios of the electrolytic manganese dioxide to the carbon material in the mixture to be subjected to electrochemical oxidation in accordance with the practice of this invention can be varied within the range of from about 0.33:1 to about 12:1. In a more narrow aspect of the present invention, preferably the weight ratios of the electrolytic manganese dioxide to the carbon material in the mixture will be varied within the range of from about 0.33:1 to about 8:1.

Like the amounts of the electrolytic manganese dioxide and carbon material utilized in preparing the mixtures employed in this invention, the amount of the third constituent, i.e., the strong base electrolyte, used in preparing these mixtures also can vary widely. For purposes of the present invention it only is critical that the amount of the strong base electrolyte, in the form of an aqueous solution, be an amount sufficient to provide for the immediate conductance of current through the mixture when the mixture is subsequently subjected to electrochemical oxidation. The precise amount required to accomplish this (the concentration of the strong electrolyte being known) readily can be determined by those of ordinary skill in this art. By way of illustration only, when the electrolyte employed is a 9 molar solution of potassium hydroxide, from about 10 weight percent to about 15 weight percent of this solution, based on the total weight of the mixture, will be sufficient to provide for the immediate conductance of a current through the mixture. Other amounts of the strong base electrolyte can be used depending upon the concentration of the electrolyte in the solution employed.

The electrolytic manganese dioxide which can be improved through the practice of the process disclosed and claimed herein can include any electrolytic manganese dioxide produced by the oxidative electrolysis of solutions containing manganese (II) ions such as, for example, a manganese sulfate solution. Oxidative electrolysis methods and the manganese dioxides produced thereby are conventional and well-known. Generally, the electrolytic manganese dioxides produced by these conventional and well-known electrolysis methods will exhibit alkaline discharge capacities ranging from about 200 to about 250 milliampere-hours per gram of the manganese dioxide when cathodically discharged in a 9 molar potassium hydroxide (KOH) solution at a rate of 20 milliamperes per gram of said electrolytic manganese dioxides to a terminus of one volt measured against a zinc counter electrode.

The carbon material employed in forming the mixture used in the process constituting this invention can include any carbon material capable of conducting an electric current. Representative examples of carbon materials suitable for use in the process of the present invention include any of the different types of conventional carbon blacks such as lamp black, channel black, furnace black, thermal black and acetylene black as well as graphite. However, of these carbon materials, the materials of choice are the furnace blacks, acetylene blacks and graphite. This preference is due primarily to the high degree of electrical conductivity possessed by these materials.

The strong base electrolytes useful in forming the mixture to be subjected to electrochemical oxidation can include any water soluble hydroxide and carbonate compound of a metal selected from the group consisting of alkali metals and alkaline earth metals. Representative, but nonlimiting, examples of useful strong base electrolytes include sodium hydroxide, potassium hydroxide, calcium hydroxide, sodium carbonate, potassium carbonate, and the like. A most preferred strong base electrolyte for use in the present invention is potassium hydroxide. The preference for using potassium hydroxide is premised on the fact that it is this strong base electrolyte which is most commonly used in the manufacture of alkaline batteries and, therefore, its use avoids the introduction of materials not otherwise found in presently available commercial alkaline batteries.

Once formed, the above described mixture then is subjected to electrochemical oxidation in the presence of further strong base electrolyte, while maintaining the mixture under anodic conditions (i.e., positively charged), by passing a direct current of predetermined magnitude and for a predetermined duration through the mixture. In one embodiment of the present invention, the electrochemical oxidation can be performed utilizing the mixture in the form of a solid compact. In laboratory experimentation conducted utilizing this particular embodiment, the mixture is pressed into a compact comprising a thin pellet of about one millimeter thickness. This pellet is attached to either a metal (e.g., steel) or a carbon based electrode and immersed in additional strong base electrolyte solution, preferably the same strong base electrolyte used in preparing the mixture, together with a counter electrode (e.g., zinc). A direct current then is passed between the two electrodes and through the pellet while maintaining the pellet under anodic conditions.

In another embodiment of this invention, the mixture can be oxidized in the form of a fluidized bed with the strong base electrolyte functioning not only as a current carrier but also as the fluidizing agent. In this embodiment, the mixture is introduced into an electrolytic cell equipped with both an anode and a cathode and fluidized therein by continuously flowing additional strong base electrolyte solution through the cell. During the electrochemical oxidation step, the fluidized mixture is maintained in direct contact with the anode, which is connected to the positive terminal of a power source, and is separated from the cathode by means of a porous membrane through which the electrolyte fluidizing agent passes for recovery and recycle to the cell. Again, a direct current is passed between the two electrodes and through the fluidized mixture while maintaining the mixture under anodic conditions.

As disclosed hereinabove, the actual electrochemical oxidation is effected by passing a direct current through the mixture of the electrolytic manganese dioxide, carbon material and strong base electrolyte while maintaining the mixture in an anodic (i.e., positively charged) condition. The current employed and its duration both will be sufficient to provide an increase in the alkaline discharge capacity of the electrolytic manganese dioxide in the mixture. Generally, this increase will be of a value of at least about 10 milliampere-hours per gram of the electrolytic manganese dioxide when cathodically discharged in a 9 M KOH solution at a rate of 20 milliamperes per gram of said electrolytic manganese dioxide to a terminous of one volt at ambient temperature versus a zinc counter electrode.

Broadly, the current employed in the practice of the present invention can range from about 5 to about 200 milliamperes per gram of the electrolytically produced manganese dioxide present in the mixture. The duration of such current will be a period of time sufficient to provide a charge to the electrolytic manganese dioxide of from about 15 to about 125 milliampere-hours per gram of the electrolytic manganese dioxide. Typically, process times required to achieve such a charge in the electrolytic manganese dioxide using the above disclosed currents, will range from about 5 to about 180 minutes. From a current efficiency standpoint, it usually will be preferred to employ currents ranging from about 10 to about 60 milliamperes per gram of the electrolytic manganese dioxide present in the mixture. Using this preferred range of currents and process times in the range of from about 20 to about 120 minutes will impart a charge to the electrolytic manganese dioxide in the range of from about 25 to about 80 milliampere-hours per gram of said electrolytic manganese dioxide. Given the above general guidelines with respect to the currents and process times which can be employed to impart a charge to the electrolytic manganese dioxide within the above disclosed ranges, it is well within the skill of those in the art to determine the precise conditions required to provide an electrolytic manganese dioxide of enhanced alkaline discharge capacity. Furthermore, while it is to be understood that if the rate of processing (i.e., charging) is important, then the use of the higher currents may be used even though this will result in a considerable overcharge to the electrolytic manganese dioxide.

Although, the improved electrolytic manganese dioxide prepared in accordance with the present invention can be employed directly to prepare alkaline batteries of the electrolytic manganese dioxide/zinc type, it generally is desirable to first subject this improved electrolytic manganese dioxide to an aqueous leach step. The purpose of this aqueous leach step is to remove from the electrolytic manganese dioxide any manganate ions in the form of water soluble manganate salts which are believed to form during the beneficial charging of the electrolytic manganese dioxide containing mixture. Although manganate ion formation can be minimized by the proper selection of the process conditions of current and time employed in the present invention, the aqueous leach step provides for the further reduction in the concentration of these ions in the desired improved electrolytic manganese dioxide. In this regard, the concentration of manganate ions can be further reduced merely by washing the improved electrolytic manganese dioxide with water or a caustic solution such as sodium or potassium hydroxide.

The following examples are offered for purposes of illustrating the process of the present invention.

EXAMPLES 1-4

A mixture is prepared comprising a noncharged electrolytic manganese dioxide, Lonza KS-44 graphite and a 9 M KOH electrolyte solution. The electrolytic manganese dioxide and graphite are present in this mixture in a weight ratio of 0.33:1 while the KOH electrolyte solution comprises approximately 15 weight percent of the total mixture. Four pellets, each being 2.5 centimeters in diameter and containing approximately one gram of the manganese dioxide, are prepared from this mixture.

Each of said pellets is placed into an electrical cell comprised of a steel plate which serves as the anodic current lead as well as the cell bottom and a Plexiglas block affixed to said plate having a 2.5 centimeter vertical hole drilled therethrough, the sides of which form the walls of the cell. The electrode arrangement of the complete cell (from bottom to top) consists of the steel base plate, the pellet, a filter paper disk, a fritted ceramic disk and additional liquid electrolyte comprising the 9 M KOH solution employed in preparing the initial mixture. A counter electrode of zinc, in the form of a coiled wire is submerged in the electrolyte, is positioned on top of the fritted ceramic disk. The cell was so constructed to exert a downward pressure on the ceramic disk and thereby maintain a tight contact between the pellet and the steel electrode base plate.

The four pellets then are subjected to electrochemical oxidation. In each instance, a current of 55 milliamperes per gram of the electrolytic manganese dioxide present in the pellet is applied to the cell for a period of 90 minutes while maintaining the pellet in an anodic (i.e., positively charged) condition. Under these electrochemical oxidation conditions, a total charge of about 82.5 milliampere-hours is imparted to each of the four pellets.

Following completion of the above charging process, the pellets are removed from the cells, powdered, repeatedly washed with water, and vacuum dried at room temperature. Finally, these powders are repelletized and the pellets cathodically discharged in a 9 M KOH solution in the above described cell. The rate of discharge employed is 20 milliamperes per gram of the electrolytic manganese dioxide contained in the pellet. This discharge is continued to an endpoint of 1 volt versus the zinc counter electrode. The mean (or averaged) alkaline discharge capacity of the four pellets containing the charged electrolytic manganese dioxide is 256 milliampere-hours per gram of said electrolytic manganese dioxide.

For comparison purposes, five additional pellets are prepared using the same noncharged electrolytic manganese dioxide as employed above but which pellets are not subjected to electrochemical oxidation. The pellets then are discharged in the same manner as described above. The mean alkaline discharge capacity of the five pellets containing the noncharged electrolytic manganese dioxide is 246 milliampere-hours per gram of said electrolytic manganese dioxide. From a comparison of the above mean alkaline discharge values for the charged and noncharged electrolytic manganese dioxide containing pellets it is evident that the process of the present invention provides an improved electrolytic manganese dioxide product.

While the invention is described in respect to what at present is considered to be the preferred embodiments, it will be understood that changes and modifications can be made therein without departing from its true scope as defined in the appended claims.

I claim:

1. A process for treating electrolytic manganese dioxide to enhance the alkaline discharge capacity thereof comprising:
   forming a mixture of electrolytic manganese dioxide, a carbon material and a strong base electrolyte;
   subjecting said mixture to electrochemical oxidation in the presence of additional strong base electrolyte while maintaining said mixture in an anodic condition;
   subjecting said oxidized mixture to an aqueous leach treatment to effect a removal of water soluble manganese salt byproducts formed during the electrochemical oxidation of said mixture; and
   recovering said oxidized and leached mixture substantially as produced.

2. The process of claim 1 wherein said electrolytic manganese dioxide and said carbon material are present in said mixture in a weight ratio of the electrolytic manganese dioxide to the carbon material up to about 12:1.

3. The process of claim 2 wherein said weight ratio ranges from about 0.33:1 to about 12:1.

4. The process of claim 3 wherein said weight ratio ranges from about 0.33:1 to about 8:1.

5. The process of claim 1 wherein said carbon material present in said mixture is selected from the group consisting of electrically conductive carbon blacks and graphite.

6. The process of claim 1 wherein said mixture is subjected to electrochemical oxidation by passing a current of at least about 5 milliamperes per gram of the electrolytic manganese dioxide contained in said mixture through said mixture.

7. The process of claim 1 wherein said strong base electrolyte is selected from the group consisting of alkali metal and alkaline earth metal hydroxides.

8. The process of claim 1 wherein the electrolytic manganese dioxide contained in the recovered oxidized and leached mixture exhibits an increase in alkaline discharge capacity of at least about 10 milliiampere-hours per gram of said electrolytic manganese dioxide when cathodically discharged in a 9 M KOH solution at a rate of 20 milliamperes per gram of said electrolytic manganese dioxide to a terminus of one volt at ambient temperature versus a zinc counter electrode.

9. A process for treating electrolytic manganese dioxide to enhance the alkaline discharge capacity thereof comprising:
   forming a mixture of electrolytic manganese dioxide, a carbon material selected from the group consisting of electrically conducting carbon blacks and graphite and a strong base electrolyte selected from the group consisting of alkali metal and alkaline earth metal hydroxides;
   subjecting said mixture to electrochemical oxidation in the presence of additional strong base electrolyte, while maintaining said mixture in an anodic condition, by passing a current of at least about 5 milliamperes per gram of the electrolytic manganese dioxide contained in said mixture through said mixture;
   subjecting the oxidized mixture to an aqueous leach treatment to effect a removal of water soluble manganese salt byproducts formed during the electrochemical oxidation of said mixture; and
   recovering said oxidized and leached mixture substantially as produced.

10. The process of claim 9 wherein said carbon material present in said mixture is graphite 11. The process of claim 10 wherein said manganese dioxide and said graphite are present in said mixture in a weight ratio of the manganese dioxide to the graphite of up to about 12:1.

12. The process of claim 11 wherein said weight ratio ranges from about 0.33:1 to about 12:1.

13. The process of claim 12 wherein said weight ratio ranges from about 0.33:1 to about 8:1.

14. The process of claim 9 wherein said strong base electrolyte is potassium hydroxide.

15. The process of claim 9 wherein said mixture is subjected to electrochemical oxidation by passing a current ranging from about 5 to about 200 milliamperes per gram of the electrolytic manganese dioxide contained in said mixture, through said mixture.

16. The process of claim 15 wherein said current imparts a charge to the electrolytic manganese dioxide contained in said mixture ranging from about 15 to about 125 milliampere-hours per gram of said electrolytic manganese dioxide.

17. The process of claim 15 wherein said current ranges from about 10 to about 60 milliamperes per gram of the electrolytic manganese dioxide contained in said mixture.

18. The process of claim 17 wherein said current imparts a charge to the electrolytic manganese dioxide contained in said mixture ranging from about 25 to about 80 milliampere-hours per gram of said electrolytic manganese dioxide.

19. The process of claim 9 wherein the manganese dioxide contained in the recovered oxidized and leached mixture exhibits an increase in alkaline discharge capacity of at least about 10 milliampere-hours per gram of said manganese dioxide when cathodically discharged in a 9 M KOH solution at a rate of 20 milliamperes per gram of said manganese dioxide to a terminus of one volt at ambient temperature versus a zinc electrode.

* * * * *